United States Patent [19]

Farr et al.

[11] Patent Number: 5,726,392
[45] Date of Patent: Mar. 10, 1998

[54] COMMUNICATIONS HOUSING HAVING GROMMET ASSEMBLY

[75] Inventors: Harbin C. Farr, Marietta; Craig O. Belflower, Fayetteville, both of Ga.

[73] Assignee: Communications Technology Corporation, Madison, Ala.

[21] Appl. No.: 804,321

[22] Filed: Feb. 21, 1997

[51] Int. Cl.$^6$ ...................................... H02G 3/18
[52] U.S. Cl. ..................... 174/65 G; 174/153 G; 439/587
[58] Field of Search ................ 174/50, 65 R, 174/65 G, 152 G, 153 G, 151, 135; 220/3.2, 4.02; 248/56; 16/2.1, 2.2; 439/274, 275, 279, 523, 587, 589

[56] References Cited

U.S. PATENT DOCUMENTS

| | | | |
|---|---|---|---|
| 1,952,695 | 3/1934 | Webb et al. | 174/151 |
| 2,406,852 | 9/1946 | Relf | 16/2.1 X |
| 2,956,106 | 10/1960 | Hasselhorn et al. | 220/4.02 X |
| 3,153,697 | 10/1964 | Faulkner | 174/151 |
| 3,182,120 | 5/1965 | Duhn | 174/151 |
| 3,510,628 | 5/1970 | Zahaykevich | 219/366 |
| 3,523,156 | 8/1970 | Phillips, Jr. | 174/38 |
| 4,071,159 | 1/1978 | Robinson et al. | 220/3.2 |
| 4,083,902 | 4/1978 | Clyde | 264/26 |
| 4,390,744 | 6/1983 | Suffi et al. | 174/41 |
| 4,578,528 | 3/1986 | Borsh et al. | 174/65 G |
| 4,656,689 | 4/1987 | Dennis | 174/153 G X |
| 4,731,501 | 3/1988 | Clark et al. | 174/153 G X |
| 4,865,792 | 9/1989 | Moyer | 264/249 |
| 4,908,482 | 3/1990 | Shimirak et al. | 174/65 G X |
| 4,928,349 | 5/1990 | Oikawa et al. | 174/153 G |
| 5,052,699 | 10/1991 | Tucker | 174/153 G X |
| 5,059,748 | 10/1991 | Allen et al. | 174/87 |
| 5,340,123 | 8/1994 | Griffiths | 277/104 |
| 5,416,271 | 5/1995 | Birmingham et al. | 174/65 R |
| 5,459,808 | 10/1995 | Keith | 385/135 |
| 5,495,549 | 2/1996 | Schneider et al. | 385/135 |
| 5,529,508 | 6/1996 | Chiotis et al. | 439/204 |
| 5,562,295 | 10/1996 | Wambeke et al. | 277/34 |
| 5,567,916 | 10/1996 | Napiorkowski et al. | 174/153 G |
| 5,635,674 | 6/1997 | Owen | 174/65 R |

FOREIGN PATENT DOCUMENTS

| | | | |
|---|---|---|---|
| 234241 | 11/1963 | Austria | 174/151 X |
| 3025866 | 3/1981 | Germany | 174/65 R X |

*Primary Examiner*—Kristine L. Kincaid
*Assistant Examiner*—Dean A. Reichard
*Attorney, Agent, or Firm*—Watts, Hoffmann, Fisher & Heinke Co., LPA

[57] ABSTRACT

An enclosure for interconnecting multiple branch connections from a trunk communications carrier. A housing supports a terminal block having connections for multiple branch cables and includes an opening for routing signal carrying cable into the housing from the trunk communications carrier. The housing also has multiple spaced apart access openings that extend along one wall of said housing to enable branch cables to be routed away from the housing from the terminal connector. A grommet assembly has a grommet strip defining multiple exit regions spaced along the grommet strip for alignment with the access openings in said one wall of the housing when secured to the housing. A plate that overlies the grommet strip for securing the grommet strip in contact with the housing and that defines a series of spaced apart openings that align with the access openings in the one housing wall and that also align with the exit regions of the grommet strip for allowing one or more branch cables to exit the plate, grommet strip and one housing wall for connection to the terminal connector.

6 Claims, 4 Drawing Sheets

5,726,392

COMMUNICATIONS HOUSING HAVING GROMMET ASSEMBLY

FIELD OF THE INVENTION

The present invention concerns an improved grommet assembly that allows multiple branch cables to be routed through the grommet assembly to an interior of a communications housing.

BACKGROUND OF THE INVENTION

In the telecommunications industry, trunk cables deliver signals from a telephone company office to subscribers throughout a region. At spaced locations the trunk cables are tapped into and routed to a terminal block mounted within an enclosure that protects the terminal block from moisture, dirt or other elements. Within the enclosure a terminal block is connected to multiple strands of a cable stub which splices into the telephone feeder cable.

Communications Technology Corporation (CTC), assignee of the present invention, presently sells a number of aerial communications housings for enclosing terminal blocks used in supplying communications signals to customer sites. These housings are designed to be suspended from trunk lines originating from the phone company central office or mounted to telephone poles that support those trunk lines. Using splice techniques known in the prior art, the trunk line is tapped into and connected to the cable stub and routed into the interior of the housing where the branch signals are coupled to the terminal block.

CTC presently sells aerial enclosures that are designated the "Hawk (R) Aerial Splice Enclosure". Issued U.S. Pat. No. 4,721,830 to Dagan et al and U.S. Pat. No. 5,322,973 to Dagan also describe prior art aerial enclosures. The disclosure of these two patents is incorporated herein by reference.

Another aerial enclosure is described in U.S. Pat. No. 4,390,744 to Suffi et al. The Suffi et al patent describes a grommet assembly that is insertable into openings in a housing. The grommet assembly seals openings but at the same time permits service wires to be extended through the openings to allow the service wires to be connected to terminal modules or terminal blocks supported within the housing.

DISCLOSURE OF THE INVENTION

The present invention includes new and improved method and apparatus for routing communications signal carrying cables through a wall of a housing. Apparatus constructed in accordance with one embodiment of the invention concerns an enclosure for interconnecting multiple branch connections from a trunk communications carrier and routing those signals by means of communication cables to multiple customer sites.

A housing supports a terminal connector for multiple branch connections and includes an opening for routing signal carrying cable into the housing from the trunk communications carrier. The housing includes multiple access openings that extend along one wall of said housing to enable branch cables to be routed away from the housing from the terminal connector.

A grommet strip is supported by the housing and defines multiple exit regions spaced along the grommet strip. These exit regions are aligned with the access openings in the wall of the housing. A plate overlies the grommet strip and secures the grommet strip in contact with the housing. The plate also defines a series of spaced apart openings that align with the access openings in the housing wall and also align with the exit regions of the grommet strip. The combination of housing wall, grommet strip and plate allow one or more branch cables to pass through the plate, grommet strip and housing wall for connection to the terminal connector.

The wall of the housing that supports the grommet strip most preferably includes spaced mounting openings that are arranged relative to the multiple access openings in the wall. The grommet strip has a plurality of corresponding openings that align with at least some of the mounting openings in the housing. The plate that overlies the grommet strip includes a number of latches that extend through the corresponding openings in the grommet strip and into the wall of the housing to hold the grommet strip in engagement with the housing.

In accordance with a preferred grommet strip construction, the exit regions of the grommet strip include crossed grooves that partially extend through an elastomeric material overlying the access openings in the housing wall. The exit regions, if not used, obstruct passage of moisture or water. As a cable is pushed through an exit region, the elastomeric material is split along the grooves forming crossed slits through which the cable extends. When occupied by a cable, the elastomeric material that bounds the crossed slits contacts the cable and also impedes water from entering the housing. If a cable is removed, the elastomeric material tends to return to its original unpierced configuration thereby narrowing the crossed slits formed by the piercing. The crossed slits are sufficiently narrow so that the elastomeric material tends to impede water from passing into the housing.

These and other objects, advantages and features of the present invention will become better understood from the accompanying detailed description of a preferred embodiment of the invention which is described in conjunction with the accompanying drawings.

BRIEF DESCRIPTION OF THE DRAWINGS

FIG. 4 is an enlarged partially sectioned perspective view of a grommet strip forming part of the grommet assembly;

BEST MODE FOR PRACTICING THE INVENTION

Figure 1:
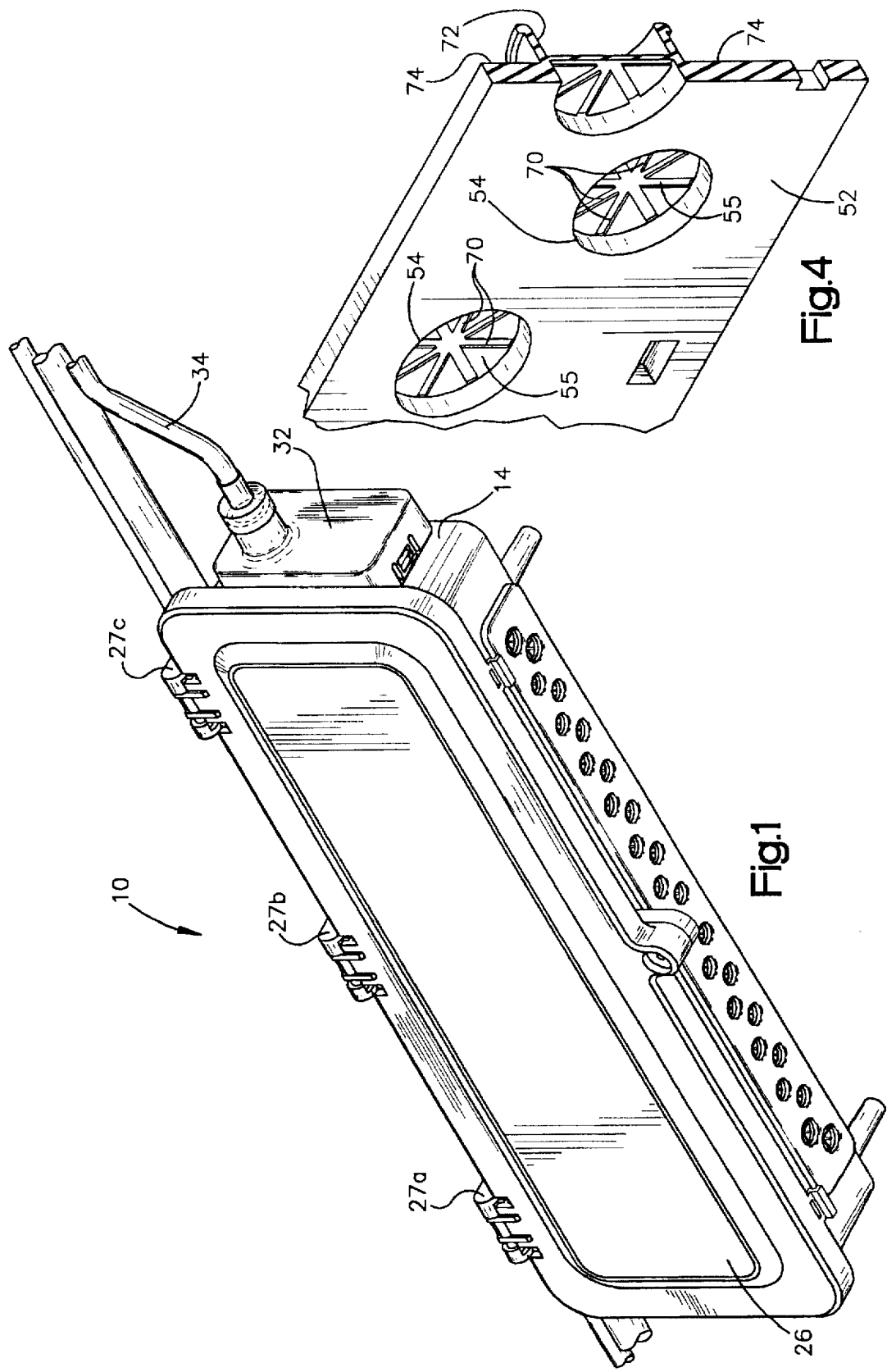
FIG. 1 a perspective view of a terminal block enclosure constructed in accordance with the present invention mounted to an overhead strand that supports a trunk cable.
Figure 2:
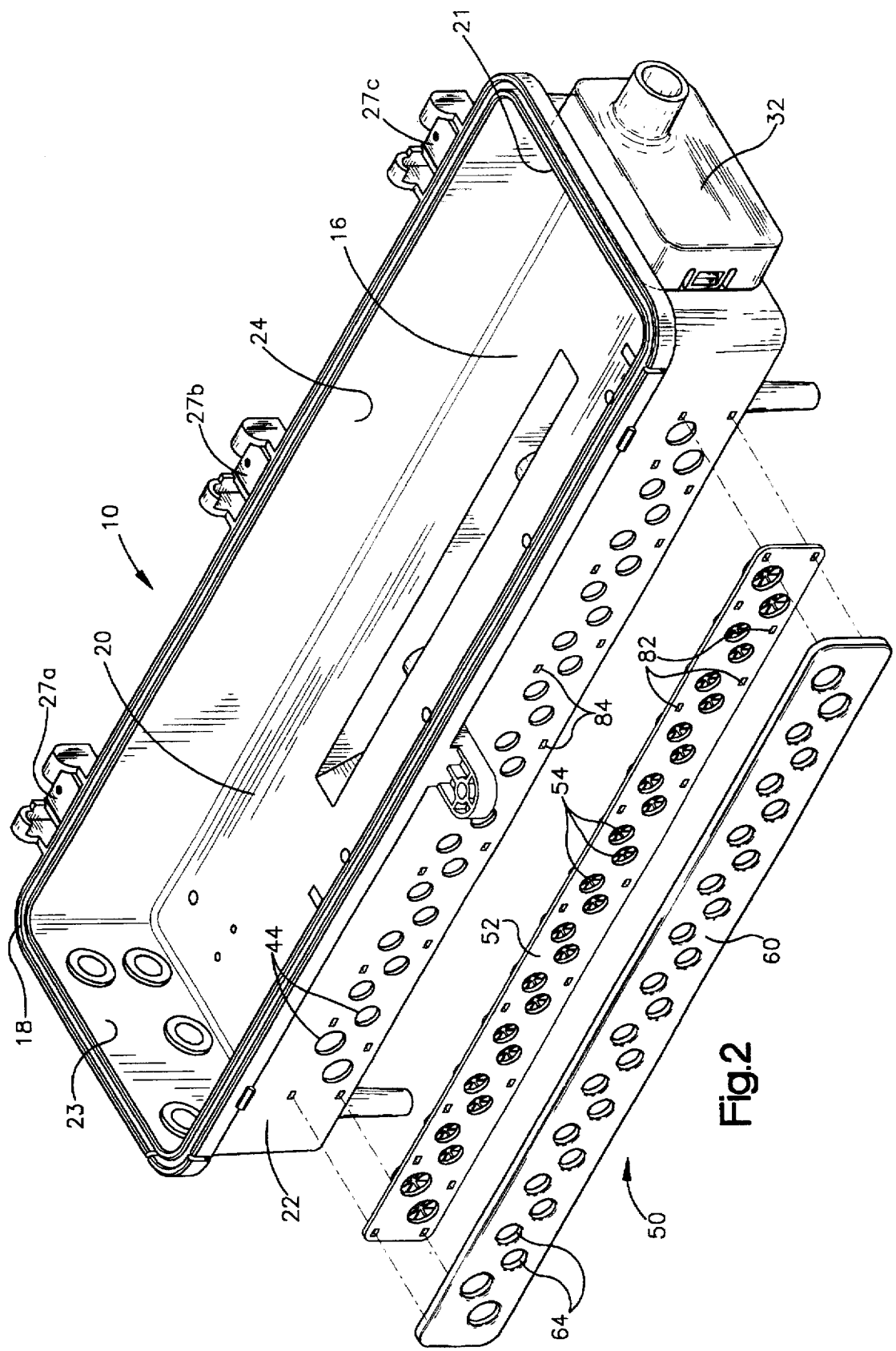
FIG. 2 is an exploded perspective view of the FIG. 1 enclosure with a cover removed depicting a grommet assembly for routing cabling into the housing.
Figure 3:
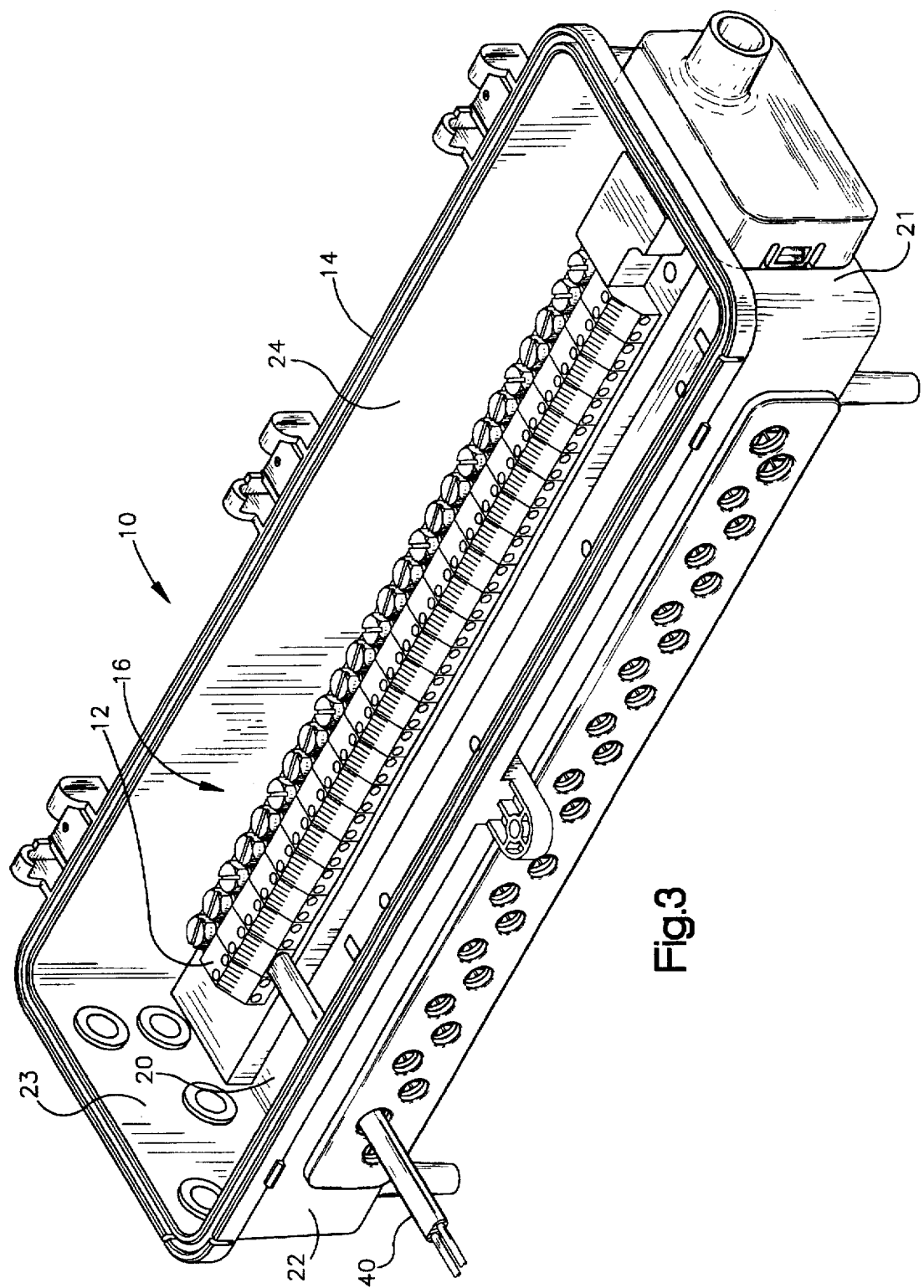
FIG. 3 is a perspective view of the FIG. 1 enclosure with a cover removed depicting a terminal block within the housing and the grommet assembly attached to the housing and a cable that extends through the grommet assembly to the terminal block.

Referring now to the drawings, FIGS. 1–3 illustrate an enclosure 10 for a terminal block 12. The enclosure 10 is molded from plastic and includes a plastic housing 14 that defines an interior region 16 adapted to support the terminal block 12. As shown in FIGS. 2 and 3, the housing 14 includes a base wall 20 and side walls 21, 22, 23, 24 that border the interior region 16. A front face 18 of the housing 14 is open. A plastic cover 26 is connected by means of three hinges 27a, 27b, 27c to the housing 14. The cover 26 can be pivoted to a first position as shown in FIG. 1 to cover the interior region 16 of the enclosure 10 or opened to a second position to expose the interior region 16.

Opening the cover 26 exposes the terminal block 12 to allow communications cables to be attached to the terminal block 12 and routed away from the enclosure 10. One side wall 21 of the housing 14 defines a terminal block opening (not shown) to permit insertion of the terminal block 12 into the interior region 16. In the preferred and illustrated embodiment, the opening is generally rectangular shaped and covered with an end cap 32 that fits over a cable stub 34.

Signals entering the enclosure 10 by means of the cable stub 34 are connected to the terminal block 12 and available for delivery by means of one or more cables 40 that are attached to the terminal block 12. These one or more cables 40 are routed through the side wall 22 of the housing 14 to customer sites in the vicinity of the housing. This housing wall 22 defines multiple spaced apart access openings 44 that extend along one wall of the housing 14 to enable the branch cables 40 to be routed away from the housing 14 from the terminal block or connector 12.

A grommet assembly 50 (as shown in FIG. 2) includes a grommet strip 52 that overlies the access openings 44 in the wall 22 of the housing 14. The grommet strip 52 defines multiple penetrable exit regions 54 spaced along the grommet strip 52 for alignment with the access openings 44 in the wall 22 of the housing 14 when the grommet strip 52 is secured to the housing 14.

The grommet assembly 50 also includes a cover plate 60 constructed from a polymeric material (preferably plastic) that overlies the grommet strip 52 for securing the grommet strip 52 in contact with the housing 14. The plate also defines a series of spaced apart openings 64 that align with the access openings 44 in the housing wall 22 and that also align with the exit regions 54 of the grommet strip 52 for allowing one or more branch cables 40 to pass through the plate 60, grommet strip 52 and housing wall 22 for connection to the terminal block 12.

Figure 5:
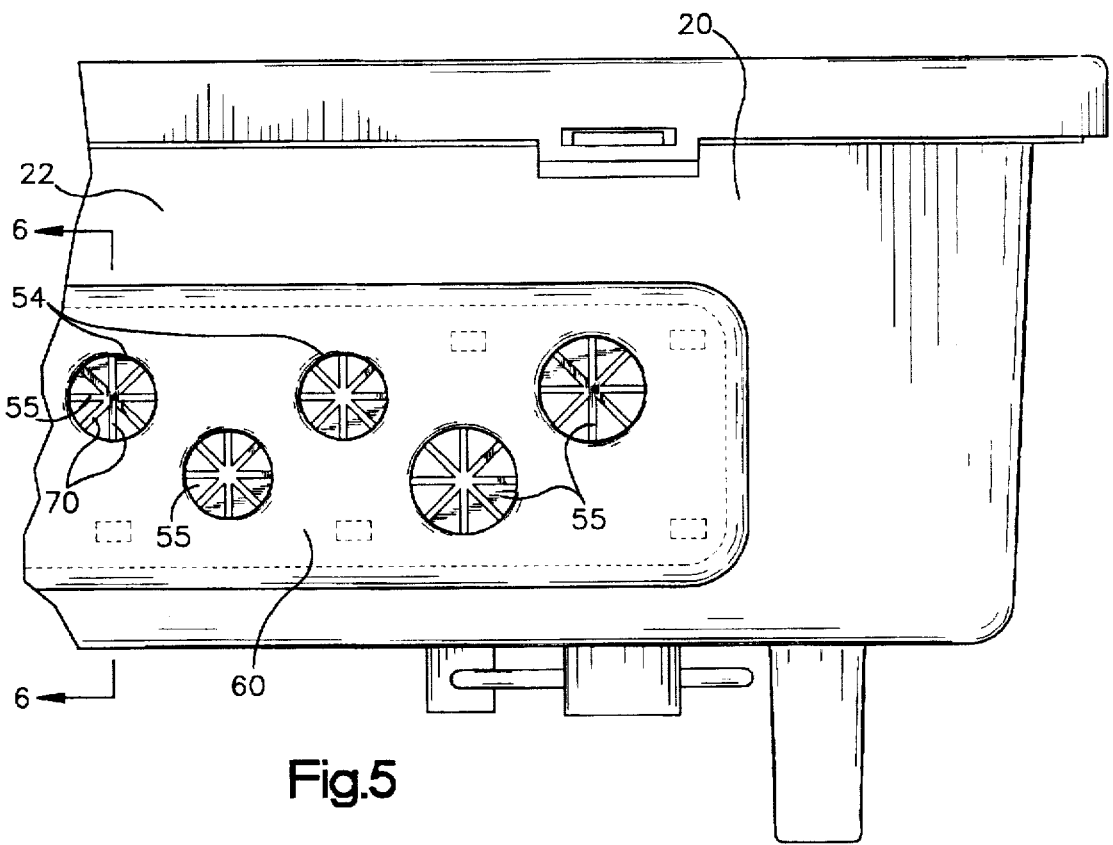
FIG. 5 is an enlarged elevation view of one wall of the housing that supports the grommet assembly.
Figure 7:
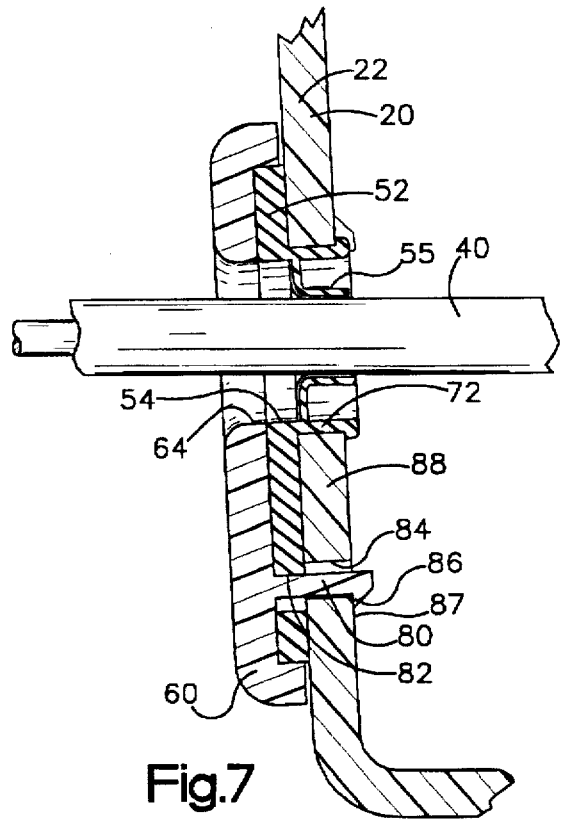
FIG. 7 is a section view of the grommet assembly showing a cable passing through one of the exit regions of a grommet strip.

The grommet strip 52 is constructed from a molded elastomeric material. As shown in FIGS. 4 and 5, the multiple exit regions 54 of the grommet strip 52 include walls 55 that define sets of crossed recesses, or grooves, 70 that extend partially through the thickness of the elastomeric material used to construct the grommet strip 52. A branch cable 40 is installed by pushing the branch cable 40 with sufficient force to pierce the wall 55 of the exit region 54. Since, the crossed grooves 70 of the elastomeric material reduce the thickness, and hence the strength, of the elastomeric material relative to the elastomeric material that bounds the grooves 70, as the branch cable 40 is pushed through the wall 55 of the exit region 54, the elastomeric material is split along the crossed grooves 70. As shown in FIG. 7, the wall 55 of the exit region 54 contacts and bounds the branch cable 40 to form a seal after the cable 40 is pushed through the exit region 54. The exit regions 54 resist passage of water or moisture through the access openings 44 in the wall 22 of the housing 14. If a branch cable 40 is removed after having been installed then the pierced wall 55 returns to its original unpierced shape. The crossed slits made in the wall as a result of the piercing are sufficiently narrow so that the elastomeric material tends to impede passage of moisture, water or other elements. If some exit regions 54 are not necessary for a particular application (for example, in an application where the quantity of access openings 44 exceeds the desired quantity of branch cables 40 to be installed) then the walls 55 of the exit regions 54 that align with the unused access openings 44 remain unpierced, and, consequently, obstruct the passage of moisture through those access openings 44.

Figure 6:
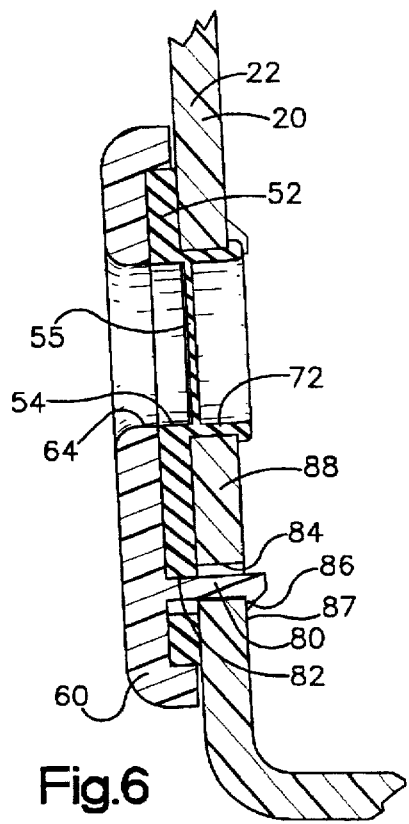
FIG. 6 is a section view of the grommet assembly as seen from the plane 6—6 of FIG. 5.

As illustrated in FIG. 4 the outer periphery of the exit regions 54 of the grommet strip 52 are bounded by inwardly extending generally circular lips 72 that extend away from a generally planar inwardly facing surface 74 of the grommet strip 52. As shown in FIG. 6, the circular lips 72 extend from the grommet strip 52 into the access openings 44 of the wall 22 of the housing 14 when the grommet strip 52 is mounted to the housing 14.

Integrally molded with the cover plate 60 are a number of latches 80 that help secure the plate 60 and grommet strip 52 to the housing 14. As shown in FIGS. 6 and 7, the latches 80 extend through corresponding openings 82 in the grommet strip 52 and into correspondingly positioned openings 84 in the wall 22 of the housing 14. The latches 80 include barbed ends 86 that overlap an inner wall surface 87 of the wall 22 when the grommet assembly 50 is attached to the housing 14. The latches 80 can be flexed toward a center section 88 of the wall 22. When flexed toward this center section 88, the barbed ends 86 are pushed into the corresponding openings 82, 84 of the grommet strip 52 and housing wall 22. After the latches 80 are pushed through these openings the latches 80 flex back to their original shape so that the barbed ends 86 overlie a part of the inner wall surface 87 to hold the cover plate 60 in engagement with the housing 14.

With the cover plate 60 attached to the housing 14, the grommet strip 52 is securely attached to the housing 14 and will not be separated from the housing 14 as the drop cables 40 are inserted through the exit regions 54 in the grommet strip 52 and routed away from the enclosure 10.

While the present invention has been described with a degree of particularity, it is the intent that the invention include all alterations and modifications from the disclosed design falling within the spirit or the scope of the appended claims.

We claim:

1. An enclosure for interconnecting multiple branch connections from a trunk communications carrier comprising:
    a) a housing for supporting a terminal connector for multiple branch connections and including an opening for routing signal carrying cable into the housing from the trunk communications carrier; said housing further comprising multiple spaced apart access openings that extend through one wall of said housing to enable one or more branch cables to be routed away from the housing from the terminal connector;
    b) a grommet strip defining multiple exit regions for alignment with the access openings in said one wall of the housing when secured to the housing; and
    c) a plate that overlies the grommet strip for securing the grommet strip in contact with the housing and that defines a series of spaced apart openings that align with the access openings in the one housing wall and that also align with the exit regions of the grommet strip for routing said one or more branch cables through the plate, grommet strip and housing wall for connection to the terminal connector;
    d) wherein said grommet strip is made from an elastomeric material and the multiple exit regions of the grommet strip include crossed grooves that extend partially through the elastomeric material overlying corresponding ones of the access openings of the one wall of said housing.

2. The apparatus of claim 1 wherein a portion of the elastomeric material contacts and bounds one of the one or more branch cables after the one cable is pushed through one of the exit regions.

3. The apparatus of claim 2 wherein the elastomeric material defines crossed slits at least partially along the crossed grooves.

4. The apparatus of claim 3 wherein the crossed slits of each of the exit regions are sized to allow one of the one or more branch cables to extend through the crossed slits and elastomeric material.

5. The apparatus of claim 1 wherein the one wall of the housing includes spaced mounting openings that are arranged relative to the multiple access openings in the wall and further wherein the grommet strip has a plurality of corresponding mounting openings that align with at least some of the spaced mounting openings and wherein the plate includes a number of latches that extend through the corresponding mounting openings in the grommet strip and into the spaced mounting openings of the one wall of the housing to hold the grommet strip in engagement with the one wall of the housing.

6. The apparatus of claim 5 wherein the latches include barbed ends and wherein the latches are constructed from a material that allows the latches to flex to a position that allows the barbed ends to be pushed into the spaced mounting openings of the one wall when the latches are flexed and wherein the latches flex back so that the barbed ends overlie a part of the wall to hold the grommet strip in engagement with the housing.

* * * * *